July 8, 1952 E. H. CARRUTHERS 2,602,579
HOPPER CONSTRUCTION AND MEANS FOR ACCURATELY FILLING
MEASURING CHAMBERS OF FOOD PACKING MACHINES
Filed Dec. 6, 1949 3 Sheets-Sheet 2

INVENTOR.
EBEN H. CARRUTHERS
BY
HIS ATTORNEY

July 8, 1952 E. H. CARRUTHERS 2,602,579
HOPPER CONSTRUCTION AND MEANS FOR ACCURATELY FILLING
MEASURING CHAMBERS OF FOOD PACKING MACHINES
Filed Dec. 6, 1949 3 Sheets-Sheet 3

INVENTOR.
EBEN H. CARRUTHERS
BY
HIS ATTORNEY

Patented July 8, 1952

2,602,579

UNITED STATES PATENT OFFICE 2,602,579

HOPPER CONSTRUCTION AND MEANS FOR ACCURATELY FILLING MEASURING CHAMBERS OF FOOD PACKING MACHINES

Eben H. Carruthers, Warrenton, Oreg.

Application December 6, 1949, Serial No. 131,392

19 Claims. (Cl. 226—102)

My invention relates to a machine for packing food products and more especially to a hopper construction therefor and, although it has uses for machines other than tuna packing machines, has been developed particularly for the packing of tuna in what has been termed in the art a "bite size" or "chunk style" pack.

In my co-pending application Serial No. 774,626, filed September 17, 1947, which issued September 4, 1951, as Patent No. 2,567,052, and entitled "Method and Apparatus for Packing Flake Materials," I have shown and described a machine for packing food products, particularly tuna fish. In the machine of that application, tuna fish in a divided state is deposited in a series of filling pockets or cylinders from a hopper. The cylinders are filled with a predetermined volume of tuna after which the tuna is compressed into a cake of substantially the desired weight and then the cakes are transferred in series to cans.

The hopper in the above mentioned application is provided with a screw or helical conveyor or agitator, the purpose of which is to prevent the fish from piling up in the hopper by agitating the fish sufficiently to induce it to fall by gravity into the series of pockets or cylinders which continuously pass beneath and in registry with the hopper. I have found that even though the tuna is cut properly so as to produce chunks or bite size pieces, the hopper and primarily the screw or helical conveyor of that application exerts a beating action and breaks up the tuna to too great a degree. A large proportion of the tuna packed thereby cannot be characterized as a "chunk style" or "bite size" pack. Instead, the tuna is in a too finely divided condition and the pack produced is not as desirable in appearance as it might be.

Reference is also made to the co-pending application of Eben H. Carruthers and Ernest M. Cameron entitled "Guillotine and Method of Cutting Materials," Serial No. 115,814, filed September 15, 1949, which is intended for use with the machine of the above mentioned application for the purpose of properly cutting the tuna by longitudinal and transverse cuts of the loins to produce what may properly be called chunks of tuna. From the cutter or guillotine of that application, the tuna is fed by a conveyor to the hopper of my above mentioned application but as previously mentioned, even though the tuna is properly cut, the hopper and screw conveyor tend to exert too rough an action on the rather delicate tuna which tends to break it up into particles which are for the most part too fine.

An object of my invention is to provide a machine which will produce a pack of tuna which may be accurately characterized as "bite size" or "chunk style."

Another object of my invention is to provide a machine having a hopper into which the chunks of tuna are fed which exerts a minimum of undesirable harsh, agitating or beating action on the chunks of tuna likely to cause them to break up into too finely a divided state.

A further object of my invention is to provide a hopper wherein a mechanism is provided for shaking the hopper, preferably in a direction longitudinally of the direction of movement of the filling pockets or cylinders, for the purpose of assisting the action of gravity in allowing the chunks of tuna to drop more or less freely from the hopper into the pockets as they pass therebeneath, the hopper and the mechanism for agitating it being designed to exert a minimum of harsh action on the tuna to preserve it in the state into which it has previously been cut, as above mentioned, and produce a pack of tuna which may properly be characterized as a "chunk style" or "bite size."

My invention further contemplates the provision of a hopper particularly adapted to be used in connection with the machine of my above mentioned co-pending application wherein means are provided for shaking the hopper, preferably in a direction longitudinally of the direction of movement of the filling pockets or cylinders, to assist the action of gravity in depositing the chunks of tuna into the pockets or cylinders as they pass continuously beneath and in registry with the hopper; the provision of a rotating cut-off or trimming knife which trims the excess tuna from the tops of the pockets so as to produce an accurate fill of the pockets by volume; and the provision of means for returning the cut-off excess back to the hopper for redeposit in a succeeding filling pocket or cylinder to the end that the tuna does not pile up and clog adjacent the cut-off knife.

Other objects and advantages of my invention will be particularly set forth in the claims and will be apparent from the following description, when taken in connection with the accompanying drawings, in which:

Fig. 4 is a side elevation of the machine;

Fig. 5 is a sectional view taken substantially on the lines 5—5 of Fig. 4 in the direction indicated by the arrows;

Fig. 6 is a sectional view showing the pockets or cylinders which continuously pass beneath the hopper to be filled volumetrically by chunks of tuna induced to flow from the hopper by gravity into the pockets and showing the action of the cut-off or trimming knife;

While the hopper and operating mechanism therefor has been particularly designed for the production of a so-called "bite size" or "chunk style" pack of tuna, it has other uses in connection with the packing of products, particularly food products which are not free flowing and which have a tendency to jam or clog in the hopper. Thus, the hopper of my invention as a unit may be employed in connection with other types of filling machines and is not necessarily restricted to use in connection with the machine of my co-pending application.

Figure 1:
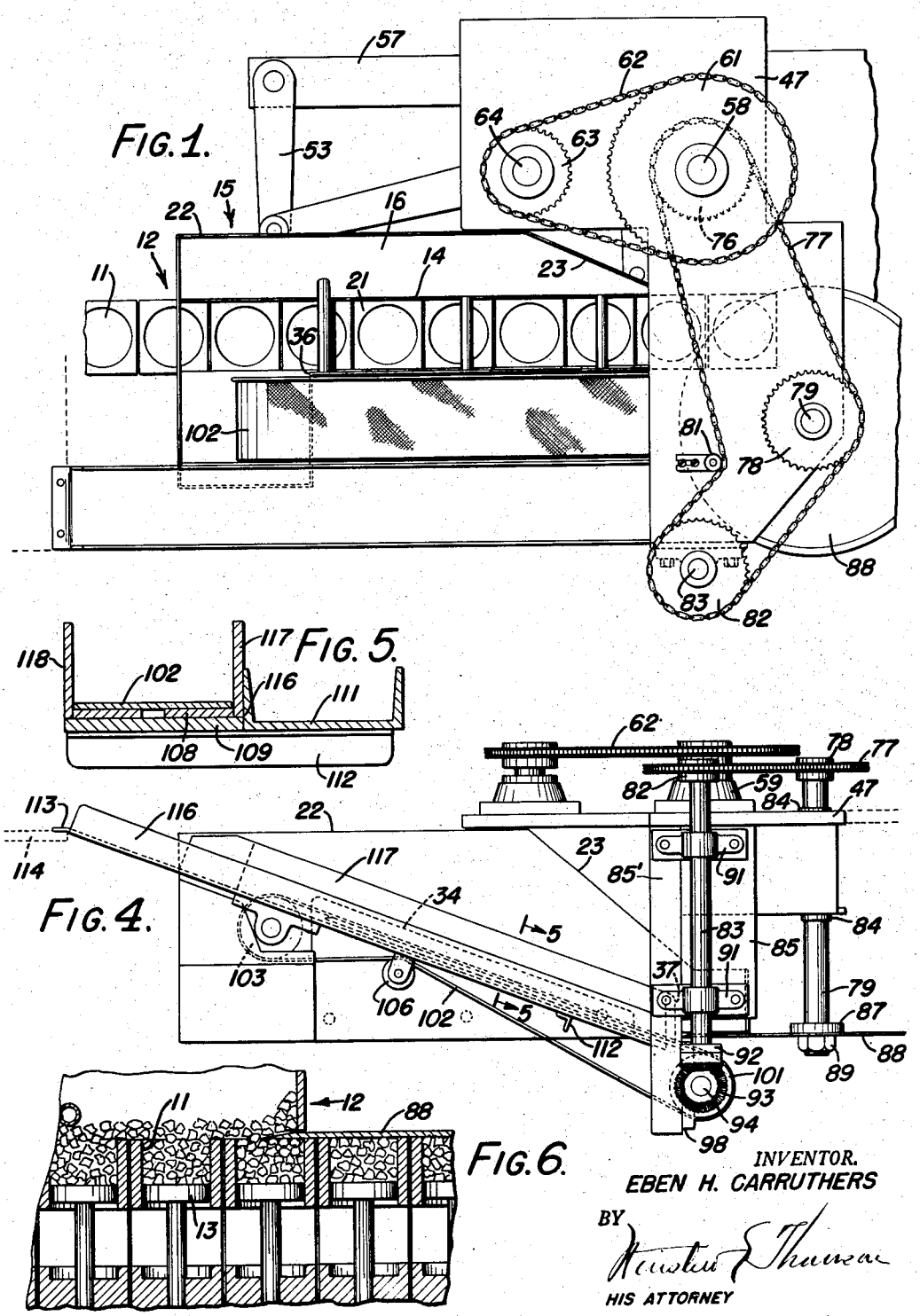
Fig. 1 is a top plan view of the hopper of my invention and showing it in relation to the continuously moving filling pockets or cylinders which it is adapted to fill.
Figure 2:
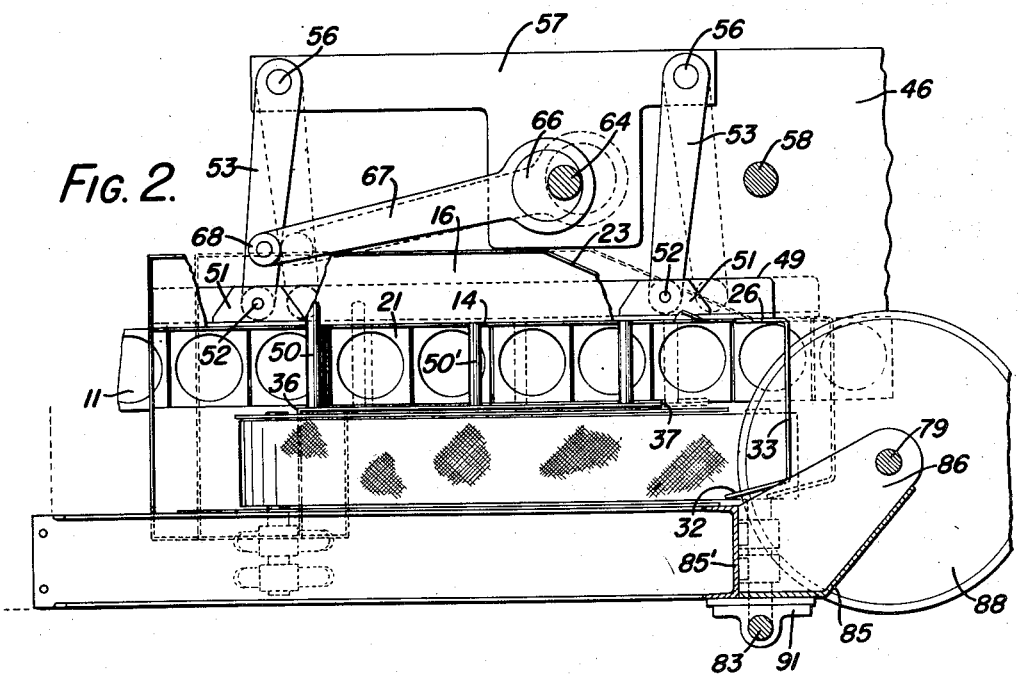
Fig. 2 is a view similar to Fig. 1 with part thereof removed, parts broken away and other parts shown in dotted lines for the purpose of better illustrating the action of the hopper and its operating mechanism.

In Figs. 1 and 2, I have shown a series of filling pockets or cylinders 11 which as described in my above mentioned co-pending application, are continuously moved through a path of travel, part of which includes a pocket or cylinder filling station generally indicated by the number 12. The filling station 12 is defined by the length of the hopper plus its amplitude of movement. In Fig. 6 I have shown the pockets or cylinders 11 in section and have indicated the plungers 13, which, as described in my above mentioned co-pending application, are raised to a predetermined adjustable height so as to provide a cylindrical volume of predetermined capacity for the reception of the chunks of tuna or other materials to be packed.

The machine of the above mentioned copending application is oval in plan view so as to provide a relatively long straight run filling station to insure full volumetric fill of the pockets or cylinders. The hopper of the present application is intended for use with said machine and constitutes a distinct improvement in the hopper construction shown in that application. While the hopper shown in this application is arranged particularly for use with a machine which is oval in plan view having a relatively long straight run for the pockets or cylinders, the hopper construction of the instant application by change in form or shape without change in general principles of operation may be constructed so as to operate in connection with a filling machine which is circular in plan view and in which the pockets or cylinders 11 move through a circular path. I contemplate embodying the principles of the present hopper suitably modified in shape and form, into a hopper construction for use in connection with a filling machine having such a circular path of movement of the filling pockets or cylinders.

Figure 8:
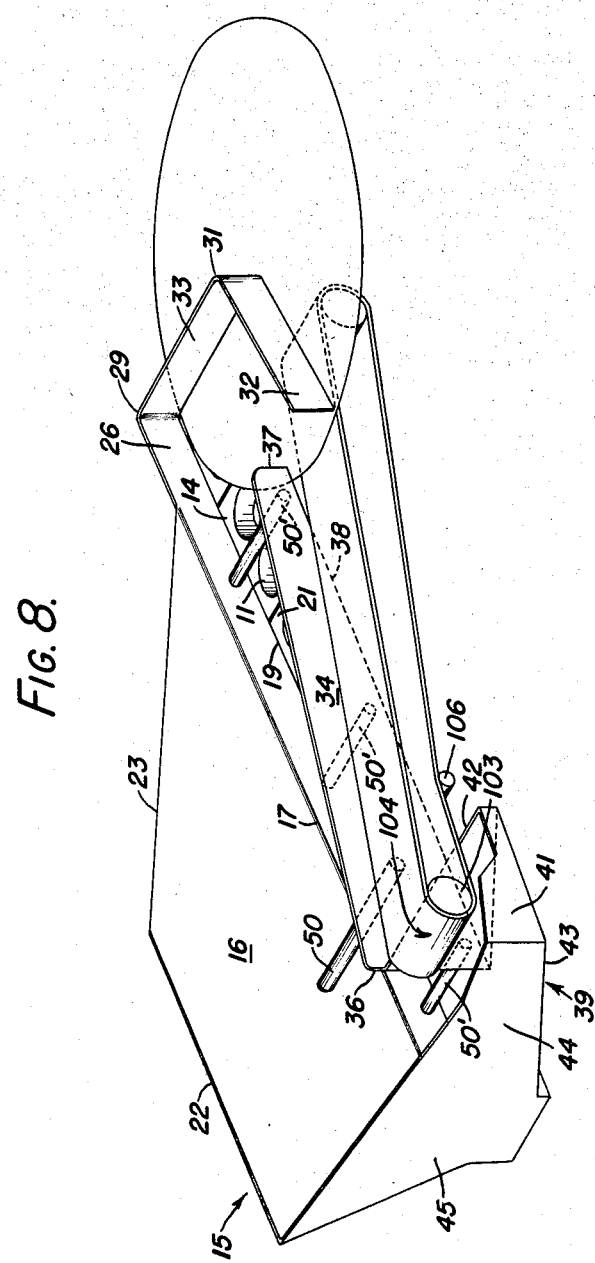
Fig. 8 is a perspective view of the hopper and its associated parts better to illustrate the shape of the hopper.

The hopper of my invention, generally indicated by the numeral 15, the shape of which is shown most clearly in Fig. 8, has a wide mouth open top for the reception of the material from a conveyor which dumps the chunks of tuna properly cut into the top opening of the hopper. The hopper also has an open bottom 14 which, as indicated in Fig. 8 and also in Figs. 1 and 2, is in registry with the filling pockets or cylinders 11 substantially throughout the extent of the filling station 12.

The hopper has a side wall 16 which slopes at a steep angle downwardly and inwardly so as to present a wide open mouth for the reception of the tuna from the delivering conveyor (not shown). The downwardly and inwardly sloping side wall 16 merges at 17 with a vertically extending wall 18, the lower longitudinal edge 19 of which is in close relationship with the upper faces 21 of the castings in which the filling pockets or cylinders 11 are formed. The downwardly and inwardly sloping side wall 16 has a horizontally extending upper edge 22 which merges with a downwardly and inwardly sloping edge 23. The edge 23 merges at 24 with the upper edge 17 of the vertical wall 18.

The vertical wall 18 is extended as shown at 26, bent transversely as shown at 29 and rebent longitudinally as shown at 31 to terminate in a free end 32 to form what may be called a combined sweep and guide 33, the function of which will be presently described.

The hopper has a vertical front wall 34 which begins adjacent the numeral 36, extends longitudinally and terminates adjacent the numeral 37. This front wall 34 has a lower edge 38 which lies adjacent the top faces 21 of the castings in which the filling pockets or cylinders are formed in a similar manner to the edge 19 of the wall 18.

The hopper includes a return chute, generally indicated by the numeral 39, which has a front wall 41, a side wall 42 merging with the front wall 34 and a steep angle downwardly sloping bottom wall 43. The return chute includes an end wall 44 which merges with the wall 45 which constitutes the end wall of the entire hopper. The front and rear walls of the hopper are connected together by tie rods 50 and 50'. The tie rods 50' are relatively closely spaced with relation to the tops of the filling pockets for a purpose which will later appear.

The entire hopper above described constitutes a single unit of sheet steel, shaped in the manner described to allow free and easy flow of material by gravity into the pockets or cylinders of the machine. When used in connection with a filling machine which is circular in plan the rear wall and possibly the front wall of the hopper are bent on the arc of a circle.

Figure 3:
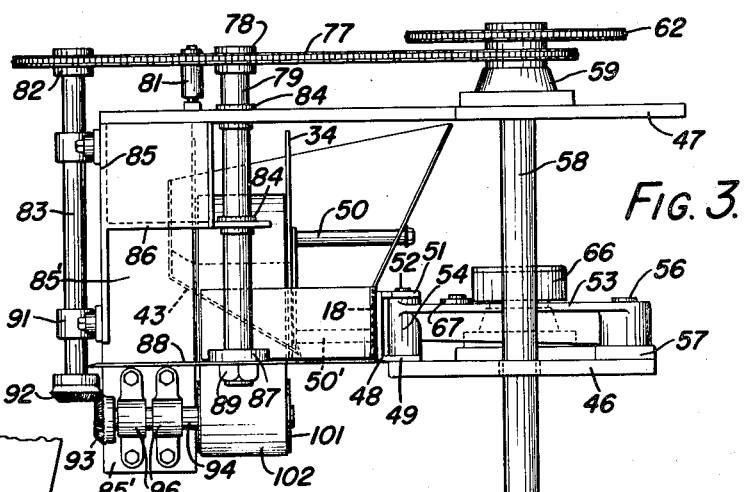
Fig. 3 is an end view of the machine looking from the right of Fig. 1.

In Fig. 3 I have indicated a portion of the means for supporting the hopper and its associated mechanism from the frame of the machine. Horizontally extending plates 46 and 47 are portions of the frame of my above mentioned co-pending application which are adapted to receive and support the hopper and associated parts thereof. The rear vertical wall 18 of the hopper, as shown in Figs. 2 and 3, has a longitudinally extending L-shaped bracket 48 secured thereto, the lower face 49 thereof constituting a slide which rides on the horizontally extending frame plate 46. Secured to the upper edge of the L-shaped member 48 is a pair of brackets 51 which, together with parts of the slide 49, provide forks for the reception of pivot pins 52. A pair of parallel arms 53 are provided with bosses 54 which have bores adapted to receive the pivot pins 52.

The arms 53 are pivoted, as indicated at 56, to a support 57 carried by the frame member 46 (Fig. 3). A main shaft 58 driven from the same source of power as the filling machine (Fig. 3) is suitably supported and journaled in the frame of the machine, as indicated at 59, and has mounted adjacent the top thereof a sprocket 61 (Fig. 1). The sprocket 61 drives a chain 62 which in turn drives a sprocket 63. The sprocket 63 is fixed to an eccentric shaft 64 which has an eccentric 66 rigidly mounted thereon (Fig. 2) which is in operative relationship to a pitman 67 pivoted to one of the arms 53 as shown at 68.

It will now be appreciated that as the main shaft is rotated, the eccentric 66 is rotated to actuate the pitman 67 and swing the left hand arm 53 as viewed in Fig. 2 about its pivot 56. The arms 53 move in parallelism and through the connections previously described reciprocate the hopper 15 in a direction parallel to the direction of movement of the filling pockets or cylinders 11.

Figure 7:
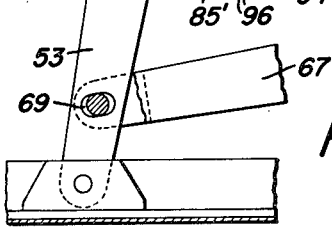
Fig. 7 is an enlarged view of a portion of the shaker mechanism for the hopper.

As shown most clearly in Fig. 7, preferably the connection between the pitman 67 and the arm 53 is formed by a pin and slot 69 so that at the beginning of each change in the direction of movement of the hopper a jar is imparted to the hopper by the rapid change in the direction of movement. The purpose of imparting a jar to the hopper is to aid in loosening any pieces of tuna which may tend to adhere to the walls of the hopper and to enable gravity to act on the mass of pieces to cause them to fall through the bottom opening of the hopper into the pockets or cylinders. At the same time the tie rods 50', three being shown in the drawings, are being reciprocated just above the filling pockets which action breaks up any tendency for the pieces to mass and clog at the outlet from the hopper.

Driven from the main shaft 58 is a second sprocket 76 which in turn drives a chain 77 which extends partway around a sprocket 78 mounted on a knife shaft 79. The chain 77 extends around an adjustable idler roller 81 and also drives a sprocket 82 mounted on and rigidly secured to a shaft 83.

As shown most clearly in Figs. 3 and 4, the knife shaft 79 is journaled in bearings 84 supported by a part of the main frame of the machine and by a horizontally extending support bracket 86 (see also Fig. 2). The support bracket 86 is integral with a vertically extending supporting wall 85 which is preferably welded to the main frame and to a vertically extending channel 85¹ (Fig. 2) also depending from and welded to the main frame.

As shown most clearly in Fig. 3, the lower end of the knife shaft 79 is enlarged, as shown at 87, to provide an abutment for the reception of a circular knife 88. The lower end of the shaft is threaded to receive a nut 89 to hold the knife on the shaft.

As appears most clearly from Figs. 3 and 4, the cut-off or trimming knife 88 rotates in a horizontal plane and is located adjacent the discharge end of the filling station (see Fig. 2) and lies immediately above and in fact substantially flush with the faces of the castings in which the filling pockets are formed (Fig. 6). The action of the trimming knife is illustrated in Fig. 6. The extent of the path of travel of the filling pockets or cylinders in registry with the hopper is relatively long, at least seven of the filling pockets being in registry with the hopper simultaneously. This relatively long length of travel insures that the pockets or cylinders will be adequately filled, in fact, over-flowing with material.

It is necessary in order to insure substantially ways at least partially full of chunks of tuna to insure that each of the pockets will receive an excess of material. Since no pressure is applied on the tuna during the filling operation, the excess material will lie above the upper horizontal plane of the pockets. This excess material is trimmed off by the trimming knife 88 so that the material is substantially flush with the plane of the tops of the filling pockets or cylinders, as indicated in Fig. 6.

As previously mentioned, the chain 77 drives the shaft 83 which for purposes of identification will be called a "belt shaft." The belt shaft 83, as most clearly shown in Fig. 4, is supported in bearing brackets 91 carried by the vertically extending support plate 85 and channel 85'. The belt shaft 83 has a bevel gear 92 mounted on the lower end thereof which meshes with a bevel gear 93 carried on the outer end of a horizontal shaft 94. The shaft 94 is suitably journaled in brackets 96 which are carried by the face of the channel 85' as indicated at 98 (Fig. 4).

The shaft 94 drives a belt pulley 101 rigidly secured thereto which in turn drives a belt 102 which passes over an idler pulley 103 (Fig. 8). The belt 102 extends from hte discharge end of the filling station longitudinally of the hopper and upwardly and discharges any material which may be deposited on the belt into the return chute 39, the belt traveling in the direction indicated by the arrows 104 (Fig. 8). As shown most clearly in Fig. 4, on its lower run the belt 102 passes over a roller 106 to maintain the belt up and out of the way.

As shown most clearly in Fig. 5, the upper run of the belt 102 rides on support plates 108 suitably secured to a plate 109. A channel 111 is suitably supported at one end by an angle 112 which also extends beneath plate 109. The upper end of the channel 111 is lipped as shown at 113 (Fig. 4) and supported by a portion 114 of the frame of the filling machine. One leg of the channel may be welded adjacent 116 to the plate 109 and to a side stand 117 which cooperates with a side stand 118 welded to the plate 109. The side stands 117 and 118 confine the material traveling with the belt in a trough as it is conveyed from the trimming knife back to the return chute 39.

It will now be appreciated that when the machine is in normal operation and the hopper is receiving pieces of chunk tuna from a conveyor (not shown) the pieces tend to drop freely into the pockets, the walls of the hopper being relatively steep and shaped so as to assist or facilitate the action of gravity. At the same time the hopper is reciprocated preferably in a direction longitudinally of the path of movement of the filling pockets or cylinders. At the beginning of each stroke the hopper is given a slap or jar so as to free any chunks which may tend to adhere to the inner side walls of the hopper and break up any tendency of the tuna to bridge across the hopper.

Due to the fact that the filling pockets or cylinders are moving to the right, as viewed in Fig. 1, there is some tendency for the material to travel in that direction. Moreover, the trimming knife which rotates in a counter-clockwise direction, as viewed in Fig. 1, cuts off excess material as indicated in Fig. 6. This cut off material, together with the natural tendency of the material to flow from left to right, as viewed in Fig. 1, tends to cause the material to pile up on the rotating knife.

with a sweep 33 which, due to the reciprocations of the hopper, causes a reciprocation of the sweep over and contiguous to the upper face of the knife. This sweeping action tends to direct the tuna at the discharge end of the filling station onto the conveyer 102, this action being aided by the confining effect of the rebent portion 32 of the sweep 33. Thus the cut off material and any material that tends to pile up on the knife is swept in a counter-clockwise direction by the action of the knife and directed up the conveyor by the sweep and particularly by the rebent portion thereof. This material is deposited by the conveyor into the return chute 39, flows down the inclined bottom wall 43 thereof and back toward the filling pockets or cylinders at the entrance end of the filling station.

It will be particularly noted that during the operation of filling the cylinders as they continuously travel in registry with the hopper, there is a minimum of any action on the chunks of tuna which will tend to break them up. The tie rods 50' do not exert a harsh action on the tuna since they are circular in section and merely tend to assist any tendency for the tuna to form a bridge across the hopper. Although the tuna is of a somewhat oily and sticky nature, the action of the hopper is such as to assist gravity and provide for relatively free flow of the chunks of tuna into the filling pockets or cylinders without exerting any harsh action on the tuna likely to break it up into undersirably small pieces or flakes.

While I have shown and described the preferred form of my invention, it will be particularly noted that the hopper of my invention may be adapted to a filling machine which is circular in plan view instead of oval in plan view as shown and described herein. It will be further apparent that various changes may be made, particularly in the form and relation of parts, without departing from the spirit of my invention as set forth in the appended claims.

I claim:

1. In a machine for packing products wherein a plurality of pockets has a continuous movement through a path which includes a filling station, a hopper arranged above and longitudinally of the path of movement of said pockets, and the pockets passing beneath the hopper from an initial position in registry with the hopper to a position wherein the pockets pass from beneath the hopper, said hopper having an open top for receiving the material and an open bottom, means for agitating the hopper in a direction longitudinally of the path of movement of the pockets to loosen the material in the hopper and cause it to drop by gravity through the bottom opening into the pockets, a rotatable trimming knife adjacent said latter position under which the pockets pass for trimming off excess material to maintain the volumetric fill of successive pockets substantially constant, and means for returning the trimmings back toward said initial position of registry with and toward the top of the hopper.

2. In a machine for packing products wherein a plurality of pockets have a continuous movement through a path which includes a filling station, a hopper arranged above and longitudinally of the path of movement of said pockets and the pockets passing beneath the hopper from an initial position in registry with the hopper to a position wherein the pockets pass from beneath the hopper, said hopper having an open top for receiving the material and an open bottom, means for reciprocating the hopper longitudinally of the path of movement of the pockets to loosen the material in the hopper and cause the material to drop by gravity through the open bottom into the pockets, a rotatable trimming knife adjacent said latter position under which the pockets pass for trimming off excess material to maintain the volumetric fill of successive pockets substantially constant, means for rotating said trimming knife, and means including an upwardly inclined conveyor for returning the trimmings back to the hopper adjacent the point where the pockets initially register with the hopper.

3. In a machine for packing products wherein a plurality of pockets pass a filling station, a hopper arranged at the filling station above the pockets, said hopper having a pair of longitudinally extending side walls at least one of which is downwardly and inwardly extending toward the other wall, a plurality of members extending transversely between the side walls in close spaced relation to the plane of the upper ends of the pockets, and means for reciprocating said hopper.

4. In a machine for packing products, the combination of a plurality of open top product receiving pockets movable past a filling station and a hopper located at the filling station for supplying the pockets with material to be packed, a circular trimming knife adjacent the end of said filling station arranged with its plane of rotation horizontal and being positioned substantially flush with the tops of the pockets for the purpose of trimming off excess material as the pockets pass, means for rotating said trimming knife, a conveyor adjacent the trimming knife for returning the trimmings to a position from whence they may be returned to the hopper, a guide located adjacent said trimming knife for directing the trimmings onto said conveyor, and means for driving said conveyor.

5. In a machine for packing products, the combination of a plurality of open top product receiving pockets movable past a filling station and a hopper located at the filling station above the path of movement of the pockets for supplying the pockets with material to be packed, said hopper being of a width in the direction of movement of the pockets such that it overlies at least two pockets and the pockets being filled as they pass the hopper from a pocket entry position to a pocket outlet position with respect to the hopper, movable means in connection with the hopper for agitating the material and urging it into the pockets, a circular trimming knife adjacent the pocket outlet position arranged with its plane of rotation horizontal and being positioned in the path of movement of the pockets and substantially flush with the open ends thereof for the purpose of trimming off excess material as the pockets pass, a conveyor adjacent the trimming knife for returning the trimmings to a position from whence they may be returned to the hopper, a guide substantially contiguous to the upper surface of said trimming knife which in cooperation with the continued rotation of said trimming knife directs the trimmings onto said conveyor, and means for driving said conveyor.

6. In a machine for packing products, the combination of a plurality of open top product receiving pockets movable past a filling station and a hopper located at the filling station above the path of movement of the pockets for supplying the pockets with material to be packed, said hopper being of a width in the direction of movement of the pockets such that it overlies at least two pockets and the pockets being filled as they pass the hopper from a pocket entry position to a pocket outlet position with respect to the hopper, movable means in connection with the hopper for agitating the material and urging it into the pockets, a circular trimming knife adjacent the pocket outlet position arranged with its plane of rotation horizontal and being positioned in the path of movement of the pockets and substantially flush with the open ends thereof for the purpose of trimming off excess material as the pockets pass, a conveyor adjacent the trimming knife for returning the trimmings to a position from whence they may be returned to the hopper, and means for driving said conveyor.

7. In a machine for packing products, the combination of a plurality of open top product receiving measuring chambers having fixed side walls, said measuring chambers having a path of movement and movable continuously past a filling station and a hopper located at the filling station for supplying the measuring chambers with material to be packed, said hopper being of a length in the direction of movement of the measuring chambers such that it extends the length of at least two measuring chambers but substantially less than the length of the entire path of movement of the measuring chambers and the measuring chambers being filled as they pass the hopper from a measuring chamber entry position to a measuring chamber outlet position with respect to the hopper, a circular trimming knife adjacent the measuring chamber outlet position and below the plane of the hopper and arranged with its plane of rotation horizontal, said trimming knife being positioned in the path of movement of the measuring chambers and substantially flush with the open tops thereof for the purpose of trimming off material overlying the tops of the measuring chambers as the measuring chambers pass, and means for rotating said trimming knife.

8. In a machine for packing products in containers, the combination of a plurality of open top and bottom product receiving measuring chambers for the reception of the material prior to its deposit in the containers, said measuring chambers having fixed side walls which extend vertically, said measuring chambers being movable continuously past a filling station and a hopper located at the filling station for supplying the measuring chambers with a quantity of material in excess of that to be packed in the containers, means for closing the bottoms of said chambers at least during their movement past the filling station, a circular trimming knife arranged with its plane of rotation horizontal and being positioned substantially flush with the tops of the measuring chambers for the purpose of trimming off excess material as the measuring chambers pass, and means for rotating said trimming knife.

9. A machine in accordance with claim 8 in which means are provided for moving the hopper backward and forward in a direction longitudinally of the path of movement of the measuring chambers.

10. A machine in accordance with claim 8 in which means are provided for moving the hopper backward and forward in a direction longitudinally of the path of movement of the measuring chambers and in which means are carried by the hopper and movable therewith which pass over the tops of the measuring chambers and tend to press the material downward into them.

11. A machine in accordance with claim 8 in which the measuring chambers are cylindrical with open tops and open bottoms, and means are provided for closing the bottoms temporarily, the bottom closing means being effective at least during the filling and trimming operations but being ineffective thereafter to enable the material to be discharged from the bottoms of the measuring chambers into containers.

12. A machine in accordance with claim 8 in which a scraper overlies and is contiguous to the upper surface of the trimming knife and prevents the material from reentering the measuring chambers after the trimming knife has performed its trimming operation.

13. In a machine for packing products, the combination of a plurality of open top product receiving measuring chambers movable continuously through an endless path of travel part of which includes a measuring chamber filling station, said measuring chambers having fixed vertically extending walls, a circular trimming knife rotatable on a vertical axis and having its cutting edge substantially flush with the open ends of the measuring chambers for trimming off any material which may overlie the tops of the measuring chambers after they pass through at least the major part of the filling station, means for rotating said trimming knife, means for temporarily closing the bottoms of said measuring chambers at least during their passage through the filling station and beneath the trimming knife and a hopper arranged at and above the filling station for directing material for deposit in the measuring chambers.

14. A machine in accordance with claim 13 in which the hopper at least partly directly overlies the measuring chambers as they pass through the filling station and means comprising an eccentric moves the hopper backward and forward through a path lying substantially in the path of travel of the measuring chambers.

15. A machine in accordance with claim 13 in which the axis of rotation of the trimming knife is outside of the path of travel of the measuring chambers and the direction of its rotation is such that its rotation moves the trimmed material away from the measuring chambers and means are provided contiguous to the upper surface of the trimming knife for insuring that trimmed material is not returned to the measuring chambers which have been trimmed.

16. A machine in accordance with claim 13 in which the axis of rotation of the trimming knife is outside of the path of travel of the measuring chambers and the direction of its rotation is opposite to the direction in which the measuring chambers are moving so that rotation of the trimming knife moves the trimmed material away from the measuring chambers and means are provided contiguous to the upper surface of the trimming knife for insuring that trimmed material is not returned to the measuring chambers which have been trimmed.

17. In a machine for packing products, the combination of a plurality of open top product receiving measuring chambers movable continuously through an endless path of travel part of which includes a measuring chamber filling station, said measuring chambers having fixed vertical walls, a circular trimming knife mounted on a vertical axis external of said path of travel, said trimming knife having its cutting edge substantially flush with the open ends of the measuring chambers for trimming off any material which may overlie the tops of the measuring chambers after they pass through at least the major part of said filling station, means for rotating said trimming knife, a hopper at least partly overlying the path of travel of the measuring chambers and being located in the filling station and above the plane of the trimming knife, means for moving said hopper backward and forward in the filling station and in a path at least partly coincident with the path of travel of the measuring chambers, the direction of rotation of said trimming knife being opposite to the direction in which the measuring chambers are moving so that rotation of the trimming knife moves the trimmed material away from the path of travel of the measuring chambers and means including an upwardly extending member having an edge contiguous to the upper surface of said trimming knife for insuring that trimmed material is not returned to the measuring chambers after they have been trimmed.

18. A machine in accordance with claim 17 in which means are provided for closing the bottoms of the measuring chambers at least during their passage through the filling station until after their passage below said trimming knife, said closing means thereafter being open for the discharge of material into containers.

19. A machine in accordance with claim 17 in which means are carried by the hopper and movable therewith which pass over the tops of the measuring chambers and tend to press the material downward into them and in which means are provided for closing the bottoms of the measuring chambers at least during their passage through the filling station and until after their passage below said trimming knife, thereafter said closing means being open for the discharge of material into containers.

EBEN H. CARRUTHERS.

REFERENCES CITED

The following references are of record in the file of this patent:

UNITED STATES PATENTS

| Number | Name | Date |
|---|---|---|
| 573,560 | Whitmarsh | Dec. 22, 1896 |
| 893,583 | Hey et al. | July 14, 1908 |
| 1,639,415 | Poplawski | Aug. 16, 1927 |
| 2,127,393 | Doney | Aug. 16, 1938 |
| 2,127,394 | Doney | Aug. 16, 1938 |
| 2,164,483 | Watson et al. | July 4, 1939 |
| 2,189,831 | Paynter et al. | Feb. 13, 1940 |
| 2,274,606 | Christiansen | Feb. 24, 1942 |
| 2,340,637 | Bauer | Feb. 1, 1944 |

FOREIGN PATENTS

| Number | Country | Date |
|---|---|---|
| 119,583 | Australia | Feb. 14, 1945 |
| 324,368 | Germany | Aug. 24, 1920 |